United States Patent [19]
Michel

[11] Patent Number: 5,535,310
[45] Date of Patent: Jul. 9, 1996

[54] RECORDING/REPRODUCTION ARRANGEMENT FOR DATA AND COMMAND PROTOCOLS IN EDP SYSTEM PERIPHERALS

[75] Inventor: Uwe Michel, Königsbrunn, Germany

[73] Assignee: Siemens Nixdorf Informationssysteme Aktiengesellschaft, Paderborn, Germany

[21] Appl. No.: 193,178

[22] PCT Filed: Jul. 24, 1992

[86] PCT No.: PCT/DE92/00599

§ 371 Date: Feb. 10, 1994

§ 102(e) Date: Feb. 10, 1994

[87] PCT Pub. No.: WO93/03433

PCT Pub. Date: Feb. 18, 1993

[30] Foreign Application Priority Data

Aug. 9, 1991 [DE] Germany ............ 41 26 465.7

[51] Int. Cl.⁶ .................................................. G06K 15/00
[52] U.S. Cl. ............................................ 395/113; 395/101
[58] Field of Search ................................ 395/113, 115, 395/101

[56] References Cited

U.S. PATENT DOCUMENTS

| | | | |
|---|---|---|---|
| 4,814,892 | 3/1989 | Igarashi | 358/296 |
| 4,947,397 | 8/1990 | Sobel et al. | 355/205 |
| 4,979,132 | 12/1990 | Sugimoto | 395/113 |
| 5,410,641 | 4/1995 | Wakabayashi et al. | 395/112 |

FOREIGN PATENT DOCUMENTS

| | | |
|---|---|---|
| 0085975 | 8/1983 | European Pat. Off. . |
| 0316609 | 5/1989 | European Pat. Off. . |
| 210776 | 6/1984 | Germany . |

*Primary Examiner*—Mark R. Powell
*Assistant Examiner*—Tracy M. Legree
*Attorney, Agent, or Firm*—Hill, Steadman 7 Simpson

[57] ABSTRACT

For recording and reproducing data and command logs in peripheral devices of EDP systems (2), for example high-performance electrophotographic printers, a storage device (10) is arranged in the peripheral device (1) and is connected to a central unit (100) of a control device (10) of the peripheral device (1) via a bus system (101). The storage device (3, 104) can be designed here as a microcomputer (3) with internal hard disk store (30), which is connected to the central unit (100) of the peripheral device (1) via a bidirectional parallel interface (103), or as an internal mass store (104) of the peripheral device (1).

12 Claims, 1 Drawing Sheet

1

RECORDING/REPRODUCTION ARRANGEMENT FOR DATA AND COMMAND PROTOCOLS IN EDP SYSTEM PERIPHERALS

BACKGROUND OF THE INVENTION

The invention relates to a recording/reproduction arrangement for data and command logs in peripheral devices of EDP systems.

Peripheral devices of EDP systems, for example high-performance electrophotographic printers, are connected to the EDP system via an interface module. Data and commands are transmitted from the EDP system, which may be a mainframe (host) for example, to a control device (controller) of the peripheral device. During communications between the mainframe and the control device of the peripheral device, fault and problem messages with respect to the controller, the user of the peripheral device and the software used can occur, which are then displayed, for example, by means of a monitor of the peripheral device. In order for it to be possible for the fault and problem messages (errors) of the high-performance printer to be analyzed by the maintenance department, central service department or the product development department, from time to time it is expedient to record the data and commands transmitted to the control device in the form of a log. Such a recording of data and commands is termed an I/O trace. By comparing the I/O trace with the specification or application, it is then possible to decide whether the present fault message relates to a problem of the peripheral device, a user problem or a software problem. The fault messages to be examined may relate to, for example, an error within the peripheral device (for example a faulty printout in the case of a high-performance electrophotographic printer), an incorrect message from the peripheral device to the EDP system, an error message from the EDP system, or a "system or printer crash". Since the problems described are generally application-specific and occur in the on-line state of the peripheral device, in the interests of economic troubleshooting it must also be possible to reproduce the error in the off-line state of the peripheral device (the off-line state referring to the peripheral device being disconnected from the EDP system as well.

In order to create such an I/O trace for error diagnostics, it is customary for the data and commands to be recorded internally in the system by the EDP system, or—as in the recording/reproduction arrangement for data and command logs in a printing device known from U.S. Pat. No. 4,947,397 by a control program initiated via an operator unit (user interface) of the printing device which controls function procedures in the printing device depending on malfunctions occurring in the control program or the printing device respectively. However, internal system recording is very susceptible to errors and must usually be carried out by the customer. The I/O trace recorded in the on-line state of the peripheral device cannot be used to reproduce the customer situation. In order to be able to reproduce the customer situation, customer data (for example jobs, texts, character sets, overlays, page segments) are stored on tape at the system and are then read out again at a test system (at the central service department for example) for troubleshooting. Since the data storage involves very complex data structures and not all the files necessary for reproducing the customer situation can be readily located, the storage of the data on a tape is very time-consuming and susceptible to errors. It can sometimes take several weeks before the required data is recorded on tape and can be reproduced. However, an error-free reproduction of the error manifestation is not guaranteed even then, since the recorded data and commands are sometimes preprocessed differently in the central service department or in the product development department than in the peripheral device to be serviced.

SUMMARY OF THE INVENTION

The object of the invention is therefore to state a recording/reproduction arrangement for data and command logs in peripheral devices of EDP systems with which the data and command logs which were transmitted on-line between the EDP system and the peripheral device are recorded in a simple manner and also independently of the EDP system in such a way that the data can be analyzed and the on-line situation can be reproduced in the off-line state of the peripheral device.

This object is achieved by the recording/reproduction arrangement of the present invention for data and command logs in peripheral devices of EDP systems. The EDP system is coupled to a control device of the peripheral device for transmitting data and commands. The control device of the peripheral device has a bus system and a central unit. A separate storage device is provided which is connected to the central unit via the bus system for recording the data and command logs.

Data and commands which are transmitted for job processing between an EDP system (mainframe) and a peripheral device, for example a high-performance electrophotographic printer, are recorded in a storage device via the peripheral device. The recording can be made, for example, via a bidirectional parallel interface of the peripheral device in a microcomputer with internal hard disk store or in an internal mass store of the peripheral device itself. This permits recording independent of the EDP system and reproduction of the I/O trace recorded in the on-line state of the peripheral device in the off-line state of the peripheral device. A faster and more economical error diagnostics of peripheral devices to be serviced by a maintenance department and a central service department is consequently also possible. It is then possible to transfer the data and commands required for error diagnostics and reproduction to said departments indirectly via transportable floppy disks or directly by means of data communications (for example modem). The off-line reproduction of the I/O trace can take place here at the customer site on the same peripheral device or else at a device of an identical type in the course of remote diagnostics (for example in the central service department).

In addition, the writing of the documentation for error diagnostics is independent of the operating system used. The capability of reproduction, which is frequently dependent on the software level of the customer, no longer presents a problem for many errors. This also results in substantial timesavings for error diagnostics. Moreover, by using a parallel interface instead of a serial interface, with the microcomputer concept the recording speed can be increased. The performance gain (higher speed) of the arrangement can furthermore be increased by recording the data and commands in the internal mass store, for example a SCSI hard disk connected directly to a central unit (CPU) of a controller of the peripheral device, of the peripheral device.

Advantageous further developments of the invention are as follows.

In the recording/reproduction arrangement the storage device, is designed as a microcomputer or as a mass store, which is arranged in the peripheral device as an internal store of the peripheral device for the accesses of the central unit. When a microcomputer is used, the microcomputer is connected to the central unit of the peripheral device via an interface module and the interface module is designed as a bidirectional parallel interface. The peripheral device is designed as a high-performance electrophotographic printer.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
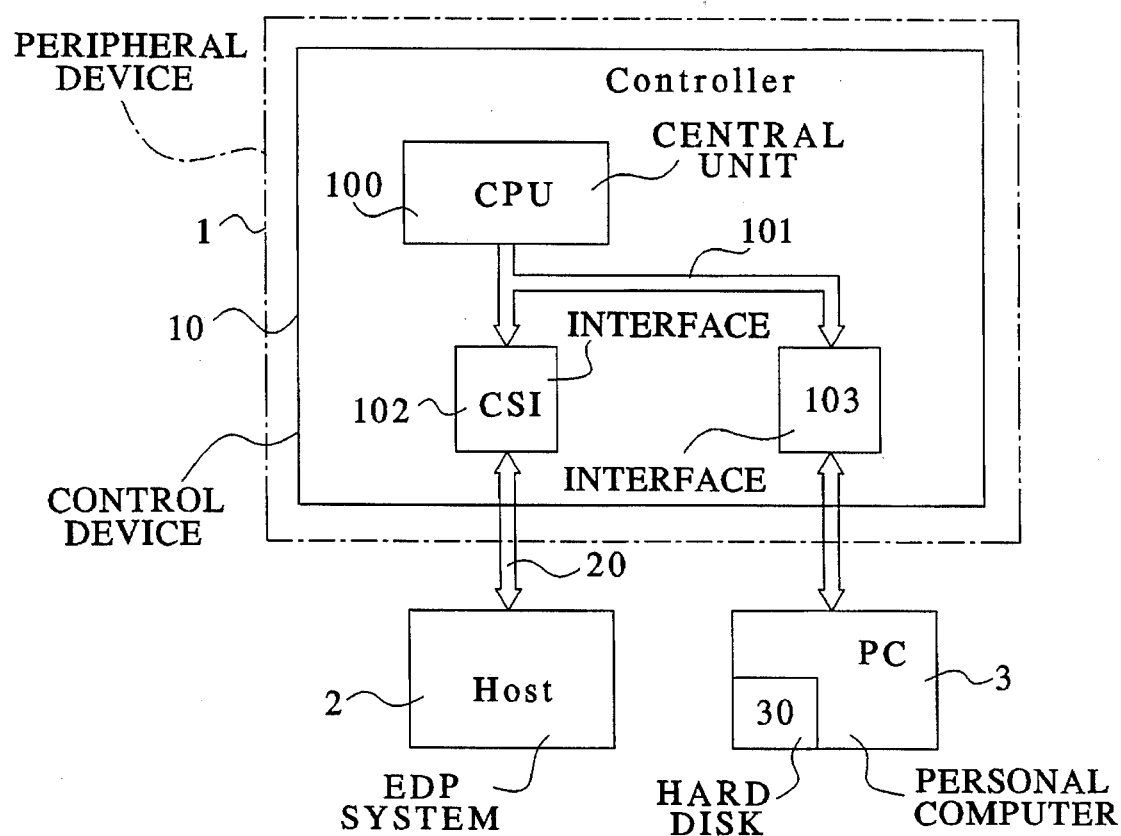
FIG. 1 shows a block circuit diagram of a control device (controller) of a peripheral device, which is connected via a peripheral interface to an EDP system and to a microcomputer for recording an I/O trace.
Figure 2:
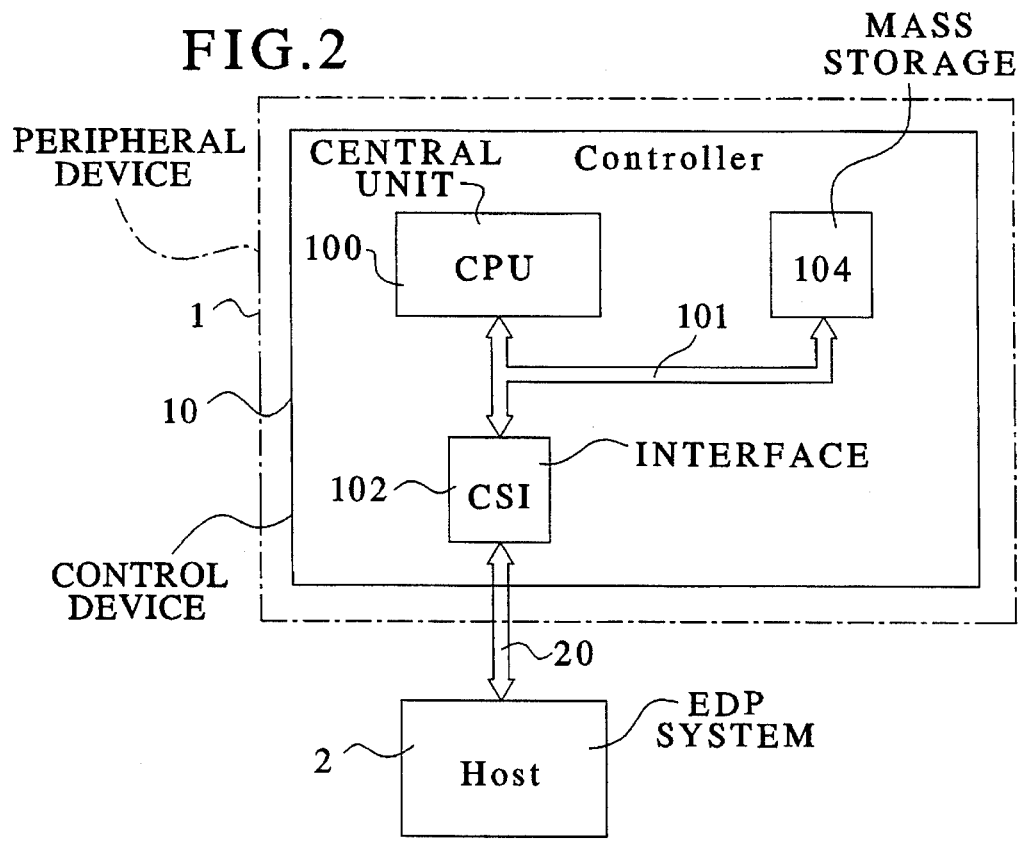
FIG. 2 shows a block circuit diagram of a control device of a peripheral device, which is connected via a peripheral interface to an EDP system and to a mass store for recording an I/O trace.

FIGS. 1 and 2 show in each case the basic connection of a peripheral device 1, for example a high-performance electrophotographic printer, to an EDP system 2. The peripheral device 1 contains a control device (controller) 10 with a central unit (CPU) 100, which is connected to the EDP system 2 via a bus system and an interface module 102 (channel specific interface =CSI) and a peripheral interface 20. The EDP system 2 is designed, for example, as a mainframe (host), from which data and commands for job processing (for example for a print job in the case of the high-performance electrophotographic printer) are transmitted to the central unit 100 of the control device 10. A person skilled in the art is familiar per se with how the data and commands are transmitted, for example for the respective print job of the high-performance printer, and how the control device 10 with the central unit 100 of the high-performance printer 1 is constructed for processing the print jobs.

In order to be able to analyze fault and problem messages (errors) with respect to the control device 1, the user of the peripheral device 1 and the software that occur during the processing of the data and commands, the data and commands transmitted from the EDP system 2 to the interface module 102 of the peripheral device 1 are recorded in a storage device.

In a first exemplary embodiment for the recording, FIG. 1 shows a microcomputer (PC=personal computer) 3, which is connected to the bus system 101 via a bidirectional parallel interface 103 of the peripheral device 1. As an alternative to the bidirectional parallel interface 103, optical fiber, HSCC (High-Level Serial Communications Controller) or SCSI (Small Computer Systems Interface) interfaces for data rates of several kilobytes per second are also possible. The data and commands (I/O trace) transferred to the microcomputer 3 are subsequently stored on a hard disk 30 of the microcomputer 3. In order to make it possible to use the trace files created with the data and commands at various locations, that is to say make them transportable, the trace files stored on the hard disk 30 are copied onto floppy disks. As a result, the recorded trace files can be analyzed at any time at the screen of a personal computer (PC) or printed out on a printer connected to the personal computer. As an alternative to the transfer of the locally recorded data and commands using floppy disks, data communications via a modem connection is also possible.

For error diagnostics of the peripheral device 1, the recorded commands and data are transferred in the off-line state of the peripheral device 1 from the microcomputer 3 via the parallel bidirectional interface 103 to the control device 10 of the peripheral device 1 again. Recorded once on-line, the error behavior of the peripheral device 1 can thus be repeated as often as desired at any identically configured peripheral device without the EDP system 2. In addition to the data and commands, memory and register values can also be fetched from the control device 10 of the peripheral device 1 to the microcomputer 3 via the bidirectional parallel interface 103 and stored on the hard disk 30 or transmitted back. The recording of the values stored in internal storage areas and register contents of the peripheral device 1 is referred to as a dump. The dump function is possible both in the on-line and in the off-line state of the peripheral device 1. The resulting files can also be copied onto floppy disks in this case and are therefore transportable. In addition, the dump function permits user-friendly "scrolling" and editing of the store of the peripheral device 1 at the screen of the microcomputer 3. Moreover, by using the microcomputer 3 for error diagnostics of the peripheral device 1, it is also possible for the central service department or the development department to perform more targeted analysis using suitable software of the microcomputer 3 with functions such as, for example, single step, break points, start points, trace print and trace edit.

In a second exemplary embodiment for the recording, FIG. 2 shows how the trace files are recorded in an internal mass store 104 of the peripheral device 1. For this purpose, the mass store 104 is connected to the central unit 100 via the bus system 101. A SCSI hard disk connected directly to the bus system 101 can be used, for example, as mass store 104. In comparison with the first exemplary embodiment, the direct recording of the trace files on a SCSI hard disk in FIG. 2 would result in a higher processing speed. The same diagnostic options as in the first exemplary embodiment are then provided by extending the control device 10 to include a display and a keyboard, or a personal computer respectively.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A recording/reproduction arrangement for data and command logs in peripheral devices of EDP systems, comprising: an EDP system coupled to a control device of a peripheral device for transmitting data and commands, the control device of the peripheral device having a bus system and a central unit, a separate storage device for recording data and command logs, the storage device being connected to the central unit via the bus system, the recorded data and command logs of an on-line operation of the peripheral device that is stored in the storage device being information via which the peripheral device can be operated off-line in an operation of the peripheral device that duplicates operation of the peripheral device during said on-line operation.

2. The recording/reproduction arrangement as claimed in claim 1, wherein the storage device is a microcomputer.

3. The recording/reproduction arrangement as claimed in claim 1, wherein the storage device is a mass store, which is arranged in the peripheral device as an internal store of the peripheral device for accesses of the central unit.

4. The recording/reproduction arrangement as claimed in claim 2, wherein the microcomputer is connected to the central unit of the peripheral device via an interface module.

5. The recording/reproduction arrangement as claimed in claim 4, wherein the interface module is a bidirectional parallel interface.

6. The recording/reproduction arrangement as claimed in claim 1, wherein the peripheral device is a high-performance electrophotographic printer.

7. A recording/reproduction arrangement for error diagnostics of peripheral devices of EDP systems, comprising: an EDP system coupled to a control device of a peripheral device for transmitting data and commands for processing a job in the peripheral device during on-line operation of the peripheral device, the control device of the peripheral device having a bus system and a central unit, a separate storage device for recording said data and commands for processing said job, the storage device being connected to the central unit via the bus system, the recorded data and commands, that are stored in the storage device, being used for duplicating the processing of said job on the peripheral device during off-line operation of the peripheral device in order to analyze errors during said on-line operation of the peripheral device.

8. The recording/reproduction arrangement as claimed in claim 7, wherein the storage device is a microcomputer.

9. The recording/reproduction arrangement as claimed in claim 8, wherein the microcomputer is connected to the central unit of the peripheral device via an interface module.

10. The recording/reproduction arrangement as claimed in claim 9, wherein the interface module is a bidirectional parallel interface.

11. The recording/reproduction arrangement as claimed in claim 7, wherein the storage device is a mass store, which is arranged in the peripheral device as an internal store of the peripheral device for accesses of the central unit.

12. The recording/reproduction arrangement as claimed in claim 7, wherein the peripheral device is a high-performance electrophotographic printer.

* * * * *